(12) United States Patent
Andrikowich et al.

(10) Patent No.: US 8,059,364 B1
(45) Date of Patent: Nov. 15, 2011

(54) HERMETICALLY SEALED CONNECTOR INTERFACE

(75) Inventors: Thomas G. Andrikowich, Whitinsville, MA (US); Kimberly C. Mann, Worcester, MA (US); Mai X. Nguyen, Worcester, MA (US)

(73) Assignee: Maxtor Corporation, Scotts Valley, CA (US)

( * ) Notice: Subject to any disclaimer, the term of this patent is extended or adjusted under 35 U.S.C. 154(b) by 1286 days.

(21) Appl. No.: 10/839,606

(22) Filed: May 4, 2004

(51) Int. Cl.
    *G11B 33/14* (2006.01)
(52) U.S. Cl. .................................................... 360/97.02
(58) Field of Classification Search ............... 360/97.01, 360/97.02
    See application file for complete search history.

(56) References Cited

U.S. PATENT DOCUMENTS

| | | | |
|---|---|---|---|
| 5,021,905 A | 6/1991 | Sleger | |
| 5,227,587 A * | 7/1993 | Paterek | 174/152 GM |
| 5,282,100 A | 1/1994 | Tacklind et al. | 360/97.02 |
| 5,337,202 A * | 8/1994 | Jabbarai et al. | 360/97.01 |
| 5,454,157 A * | 10/1995 | Ananth et al. | 29/603.03 |
| 5,541,787 A * | 7/1996 | Jabbari et al. | 360/97.01 |
| 5,641,713 A * | 6/1997 | Kyle | 156/330 |
| 5,666,243 A | 9/1997 | Brent | 360/106 |
| 5,743,754 A * | 4/1998 | Cristich | 439/349 |
| 5,747,363 A * | 5/1998 | Wei et al. | 438/5 |
| 5,784,296 A | 7/1998 | Baker et al. | 364/551.01 |
| 6,121,770 A * | 9/2000 | Sudo | 324/244 |
| 6,144,178 A | 11/2000 | Hirono et al. | |
| 6,178,059 B1 | 1/2001 | Frees | 360/75 |
| 6,222,375 B1 | 4/2001 | Fitzpatrick et al. | 324/601 |
| 6,317,286 B1 | 11/2001 | Murphy et al. | |
| 6,392,838 B1 | 5/2002 | Hearn et al. | 360/97.02 |
| 6,413,800 B1 * | 7/2002 | Kyle | 438/115 |
| 6,421,253 B1 | 7/2002 | Ash, Jr. | |
| 6,430,000 B1 * | 8/2002 | Rent | 360/97.03 |
| 6,496,362 B2 | 12/2002 | Osterhout et al. | |
| 6,521,898 B2 * | 2/2003 | Chutjian et al. | 250/427 |
| 6,525,899 B2 * | 2/2003 | Hearn et al. | 360/97.02 |
| 6,567,235 B2 * | 5/2003 | Kasetty et al. | 360/97.01 |
| 6,618,221 B2 | 9/2003 | Gillis et al. | |
| 6,631,053 B1 | 10/2003 | Chew | 360/265.7 |
| 6,644,362 B2 | 11/2003 | Bernett | |
| 6,646,821 B2 | 11/2003 | Bernett | |
| 6,678,102 B1 | 1/2004 | Liikanen et al. | 360/31 |
| 6,683,747 B2 | 1/2004 | Bernett | |
| 6,762,909 B2 | 7/2004 | Albrecht et al. | |
| 6,765,379 B1 | 7/2004 | Marshall et al. | |

(Continued)

FOREIGN PATENT DOCUMENTS

WO   WO 2004/010419 A1   1/2004

(Continued)

OTHER PUBLICATIONS

U.S. Appl. No. 10/055,237, filed Oct. 24, 2001, Marshall et al.

(Continued)

*Primary Examiner* — David D Davis
(74) *Attorney, Agent, or Firm* — Fellers, Snider, et al.

(57) ABSTRACT

The present invention relates to preformed seals used in the manufacture of low density gas filled disk drives. The seals may be preformed to facilitate positioning in the disk drive and eliminate the need for manually applied or semi-automatically applied epoxies, thereby reducing manual labor costs, non-uniform seals, waste and inefficiencies due to equipment malfunction. The epoxy seals may soften and seal after being positioned, thereby forming an in-place hermetic or substantially hermetic seal.

18 Claims, 4 Drawing Sheets

U.S. PATENT DOCUMENTS

| | | |
|---|---|---|
| 6,785,082 B2 | 8/2004 | Fiorvanti et al. |
| 6,785,089 B2 | 8/2004 | Bernett |
| 6,831,811 B1 | 12/2004 | Andrikowich et al. |
| 6,876,515 B2 | 4/2005 | Unno |
| 6,898,043 B2 | 5/2005 | Fioravanti |
| 6,914,742 B1 | 7/2005 | Fioravanti et al. |
| 6,930,858 B2 | 8/2005 | Gunderson et al. |
| 6,962,338 B2 * | 11/2005 | Moidu ............... 277/316 |
| 6,970,322 B2 | 11/2005 | Bernett |
| 6,989,493 B2 * | 1/2006 | Hipwell et al. ......... 174/151 |
| 6,999,262 B2 | 2/2006 | Han et al. |
| 7,008,689 B2 * | 3/2006 | Hawkins et al. ......... 428/292.1 |
| 7,016,145 B2 * | 3/2006 | Gunderson et al. ...... 360/97.02 |
| 7,019,942 B2 * | 3/2006 | Gunderson et al. ...... 360/96.51 |
| 7,062,387 B1 | 6/2006 | Burns et al. |
| 7,123,440 B2 * | 10/2006 | Albrecht et al. ........ 360/97.02 |
| 2003/0007280 A1 | 1/2003 | Bernett et al. .......... 360/77.02 |
| 2003/0026033 A1 | 2/2003 | Fioravanti et al. ........ 360/75 |
| 2003/0081349 A1 | 5/2003 | Bernett ................ 360/97.02 |
| 2003/0089417 A1 | 5/2003 | Bernett ................ 141/65 |
| 2003/0090832 A1 | 5/2003 | Bernett et al. ......... 360/97.02 |
| 2003/0172520 A1 | 9/2003 | Liu et al. |
| 2003/0179489 A1 | 9/2003 | Bernett et al. ......... 360/97.01 |
| 2003/0202276 A1 | 10/2003 | Smith ................. 360/97.02 |
| 2004/0216514 A1 | 11/2004 | Nunnally et al. |
| 2005/0056965 A1 * | 3/2005 | Hawkins et al. ......... 264/258 |
| 2005/0068666 A1 | 3/2005 | Albrecht et al. |
| 2005/0173870 A1 | 8/2005 | Gunderson |
| 2005/0184463 A1 | 8/2005 | Boutaghou et al. |
| 2006/0002067 A1 | 1/2006 | Gunderson et al. |
| 2006/0044666 A1 | 3/2006 | Fukushima |
| 2006/0044675 A1 | 3/2006 | Fukushima et al. |
| 2006/0072241 A1 | 4/2006 | Feliss et al. |
| 2006/0072244 A1 | 4/2006 | Rapp |

FOREIGN PATENT DOCUMENTS

WO  WO 2004/010431 A1  1/2004

OTHER PUBLICATIONS

U.S. Appl. No. 10/266,436, filed Oct. 8, 2002.
U.S. Appl. No. 10/839,608, filed May 4, 2004, deJesus et al.
U.S. Appl. No. 10/848,476, filed May 17, 2004, Burns et al.
U.S. Appl. No. 10/839,611, filed May 4, 2004, Gifford et al.
U.S. Appl. No. 10/839,548, filed May 4, 2004, Andrikowich et al.
U.S. Appl. No. 10/839,685, filed May 4, 2004, Andrikowich et al.
U.S. Appl. No. 10/860,626, filed Jun. 2, 2004, Mann et al.
IBM Corp., "Seal for a Hermetically Sealed Disk File," IBM Technical Disclosure Bulletin, vol. 27, No. 11 (Apr. 1985).

* cited by examiner

HERMETICALLY SEALED CONNECTOR INTERFACE

BACKGROUND OF THE INVENTION

Hard disk drives incorporate magnetic storage disks and read/write heads which are capable of reading data from and writing data onto the rotating storage disks. Data is typically stored on each magnetic storage disk in a number of concentric tracks on the disk. The read/write heads, also referred to as read/write transducers or read/write elements, are integrated within a slider. The slider, in turn, is part of an actuator assembly which positions the heads relative to the surface of the storage disks. This may be at a predetermined height above the corresponding storage disk or, in some instances, in contact with the surface of the storage disk. The actuator assembly is typically positioned by a voice coil motor which acts to position the slider over a desired track. One or more read/write heads may be integrated within a single slider. In the case of non-contact sliders, a cushion of air is generated between the slider and the rotating disk. The cushion is often referred to as an air bearing.

Hard disk drives are an efficient and cost effective solution for data storage. Depending upon the requirements of the particular application, a disk drive may include anywhere from one to a plurality of hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

A primary goal of disk drive assemblies is to provide maximum recording density on the storage disk. In order to provide greater storage capacity on a storage disk, track widths have become increasingly narrower. However, decreasing the width of tracks makes it more difficult for the read/write heads to accurately read and write information to and from the narrowing tracks. Not only is it difficult to physically position the read/write element over a narrow width track, but it is increasingly difficult to maintain the read/write element over the track at an optimal position for accurate data transfer. Air turbulence created by the spinning disks, disk flutter and spindle vibrations, temperature and altitude can all adversely effect registration of the read/write element relative to the tracks. Moreover, increasing the speed of the rotating disks to achieve increased data access times increases air turbulence, which increases misregistration between the read/write element and the tracks on the storage disks (track misregistration or TMR). Higher rotational speeds can also increase disk flutter and spindle vibrations further increasing TMR. Higher rotational speeds can also increase spindle motor power and idle acoustics.

Accuracy can be further adversely effected if the read/write heads are not maintained within an optimum height range above the surface of the storage disk. Thus, a related goal is to increase reading efficiency or to reduce reading errors, while increasing recording density. Reducing the distance between the magnetic transducer and the recording medium of the disk generally advances both of those goals. Indeed, from a recording standpoint, the slider is ideally maintained in direct contact with the recording medium (the disk) to position the magnetic transducer as close to the magnetized portion of the disk as possible. Contact positioning of the slider permits tracks to be written more narrowly and reduces errors when writing data to the tracks. However, since the disk rotates many thousands of revolutions per minute or more, continuous direct contact between the slider and the recording medium can cause unacceptable wear on these components. Excessive wear on the recording medium can result in the loss of data, among other things. Excessive wear on the slider can result in contact between the read/write transducer and the disk surface resulting, in turn, in failure of the transducer, which can cause catastrophic failure.

Similarly, the efficiency of reading data from a disk increases as the read element is moved closer to the disk. Because the signal to noise ratio increases with decreasing distance between the magnetic transducer and the disk, moving the read/write element closer to the disk increases reading efficiency. As previously mentioned, the ideal solution would be to place the slider in contact with the disk surface, but there are attendant disadvantages. In non-contact disk drives there are also limitations on how close a read/write element may be to the surface of a disk. A range of spacing is required for several reasons, including the manufacturing tolerances of the components, texturing of the disk surface and environmental conditions, such as altitude and temperature. These factors, as well as air turbulence, disk flutter and spindle vibration, can cause the read/write element flying height to vary or even cause the read/write element to contact the spinning disk.

Disk drives are assembled in a clean room to reduce contamination from entering the drive prior to final assembly. Thus, the air that is trapped within the drive once it is finally sealed is filtered room air. Accordingly, seals or gaskets used in disk drives between the housing components, such as between the base plate and cover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

As an alternative to air-filled drives, advantages may be achieved by filling disk drives with gases having a lower density than air. For example, helium has a lower density than air at similar pressures and temperatures and can enhance drive performance. As used herein, a low density gas or a lower density gas means a gas having a density less than that of air. When compared with air, lower density gases can reduce aerodynamic drag experienced by spinning disks within the drive, thereby reducing power requirements for the spindle motor. A low density gas-filled drive thus uses less power than a comparable disk drive that operates in an air environment. Relatedly, the reduction in drag forces within the low density gas-filled drive reduces the amount of aerodynamic turbulence that is experienced by drive components such as the actuator arms, suspensions and read/write heads. Some low density gases also have greater thermal conductivity, which results in better motor efficiencies and therefore lower power consumption for a given performance level. Reduction in turbulence allows drives filled with low density gas to operate at higher speeds compared with air-filled drives, while maintaining the same flying height and thereby maintaining the same range of read/write errors. Low density gas-filled chives also allow for higher storage capacities through higher recording densities due to the fact that there is less turbulence within the drive which allows the tracks to be spaced more closely together.

Despite these advantages, low density gas-filled drives have not been commercially successful. Low density gas-filled drives, in order to function, must be effectively sealed over an acceptable lifetime of the drive. It has been difficult to prevent the low density gas from escaping from the sealed drive environment. Unlike air-filled drives, a port may not be used to equalize pressure outside and inside the drive. As a result, the seal between the cover and base plate must minimize or prevent leakage and maintain a threshold level of low density gas within the sealed environment over the expected lifetime of the drive. Conventional rubber seals used in air-filled drives are inadequate at preventing leakage of low density gas due to the smaller atom size of low density gases, such as helium, compared to air. The smaller helium atoms diffuse through the rubber seals, thereby reducing the volume of low density gas within the drive. Thus, over time, the necessary threshold quantity of low density gas may be lost within the drive environment and may or may not be replaced with ambient air. In either case, the performance of the drive will change from the design specifications, namely, a low density gas-filled sealed environment. As the low density gas leaks out of a drive and is replaced by air, the drive is subject to undesirable operational effects possibly leading to unacceptable error rates and/or failure of the drive. For example, the increased concentration of air may increase the turbulent forces on the heads due to the increased drag forces within the drive which may further cause the heads to fly at too great a distance above the disks and potentially increasing instances of read/write errors. If the low density gas leaks from the sealed environment over time and is not replaced by ambient air, problems will occur such as the heads flying at a distance too close or in contact with the disks, thereby increasing instances of read/write errors as well as damage to the disk surface and head and higher operating temperatures due to a reduction in conduction cooling. Each creates a reliability risk. The risk of unanticipated failures due to inadequate amounts of low density gas within the drive is a draw back to low density gas-filled drives. Indeed, data stored within the drive may be irretrievably lost if the drive fails due to the loss of the low density gas environment.

Low density gas-filled drives also must be designed to permit testing and rework, if necessary. Thus, the ability to seal openings in the base plate and/or cover plate on a temporary basis and on a long-term basis must exist. Such openings include, but are not limited to, openings for securing ends of the spindle and actuator shafts to the cover or base plate, or openings to permit self servo-writing. These openings must be adequately sealed to permit testing of the drive under normal conditions and, if possible, unsealed to permit rework. Thus, it is desirable to minimize waste and optimize efficiencies when sealing a disk drive housing to allow rework when needed.

Seals are a critical component for any disk drive, particularly low density gas filled disk drives. One critical sealing location is around electrical connectors in the disk drive base plate. For example, multi-pin input/output connectors are used to connect the printed circuit board, typically secured to the exterior of the base plate, to the electrical components within the sealed interior portion of the drive housing, such as the flex circuit. Prior to the present invention, an epoxy sealant was dispensed either manually, such as with a hand-operated syringe, or semi-automatically using a dispensing machine which mixes and applies adhesives and sealants during the assembly process. Because manual labor is involved in each of these processes, these application methodologies are relatively costly. Moreover, it is also difficult to maintain uniform consistency in the application, placement and quantity of the sealing epoxy due to the use of manual labor and/or due to the need to continuously add component epoxies to mixing and dispensing machines and simultaneously maintain operation of the machines which tend to clog over time. These methods require additional processing time for mixing and dispensing of component epoxies and require specialized equipment to apply the sealing epoxy and to try to accurately control volume and placement of the epoxy. These techniques also require regular and frequent equipment cleanup and maintenance which is labor-intensive. These methods are also inefficient in terms of material usage. Not only does the quantity of epoxy applied vary, possibly resulting in the waste of epoxy, but a large quantity of epoxy remains unused in the dispensing equipment, cannot be subsequently used and is discarded.

Another drawback of these techniques is contamination of the electrical or input/output pins by the sealing epoxy. Either the epoxy is applied first, requiring the pins of the connector to push through the pre-existing epoxy, or the epoxy is applied following assembly of the connector, in which case the application methodology causes the epoxy to contact and contaminate the pins. In each scenario, the epoxy-coated pins may no longer create a reliable electrical connection between electrical components on opposite sides of the base plate. In turn, this can cause electrical failures in the disk drive.

SUMMARY OF THE INVENTION

Various embodiments of the present invention are generally directed to a method for establishing an electrical interconnect through a hermetically sealed housing.

In accordance with some embodiments, the method generally comprises positioning an epoxy seal member adjacent a housing aperture extending through a housing member, the epoxy seal member having a first shape and a pin aperture; placing an electrical connector onto the epoxy seal member so that an electrical pin extending from the electrical connector extends through the pin aperture in the epoxy seal member and into the housing aperture of the housing member; and curing the epoxy seal member so that the epoxy seal member changes to a second shape and respectively adheres to the electrical pin and the housing member to form a substantially hermetic seal of the housing aperture while permitting an electrical connection between components on opposite sides of said housing member.

In accordance with other embodiments, the method generally comprises placing an uncured epoxy seal member, having a first temperature, adjacent a housing aperture in a housing member so that an electrical pin of a connector extends through a preformed pin aperture in the seal member and into the housing aperture; and increasing the temperature of the seal member to a second temperature to cure the seal member so as to sealingly adhere to the electrical pin and form a hermetic seal of the housing aperture.

DETAILED DESCRIPTION

Figure 1:
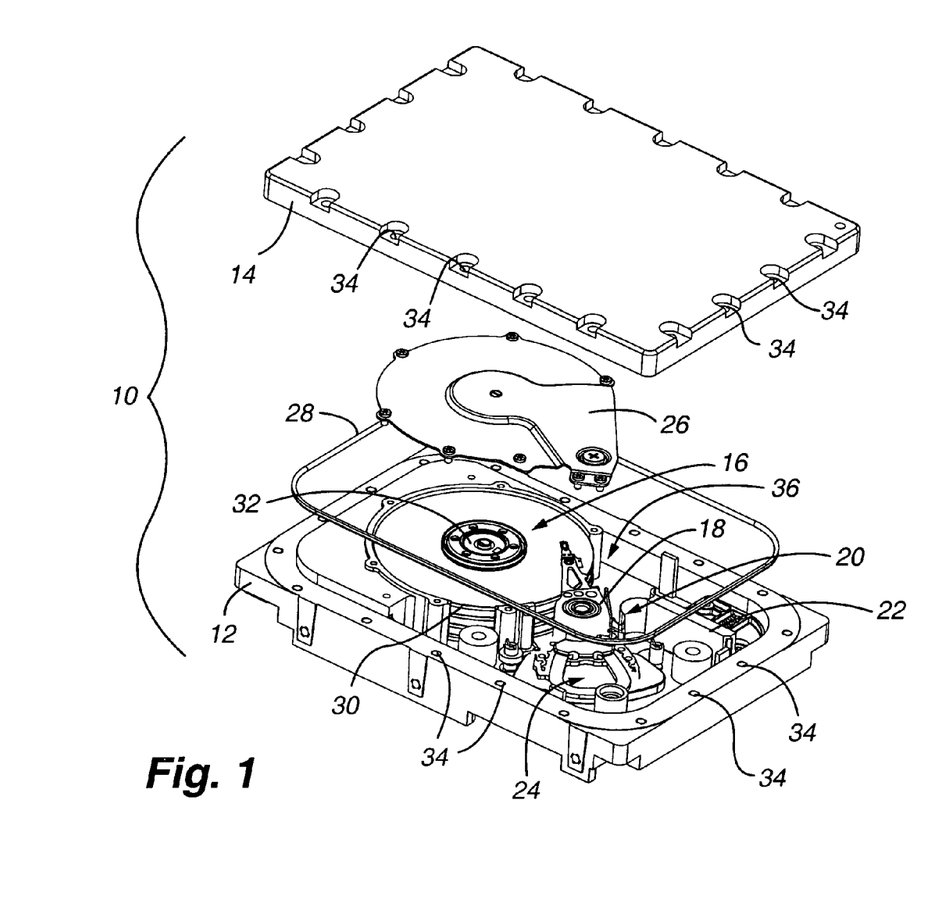
FIG. 1 is an exploded perspective view of a hard disk drive manufactured using the present invention.

FIG. 1 is an exploded perspective view of one embodiment of a low density gas filled disk drive 10. In general terms, the disk drive comprises a base plate 12, cover plate 14, disk stack assembly 16, actuator assembly 18, flex circuit 20, connector wiring harness and mounting bracket 22, voice coil motor 24, capture plate 26 and metal seal 28. The individual storage disks 30 are mounted on a rotating hub 32. The base plate and cover include aligned apertures 34 evenly spaced around their perimeters for securing the cover and base plate together using approved fasteners. When sealed together, the base plate and cover create an inner cavity or chamber 36. Following final assembly, the inner chamber is filled with a low density gas, such as helium.

Figure 2:
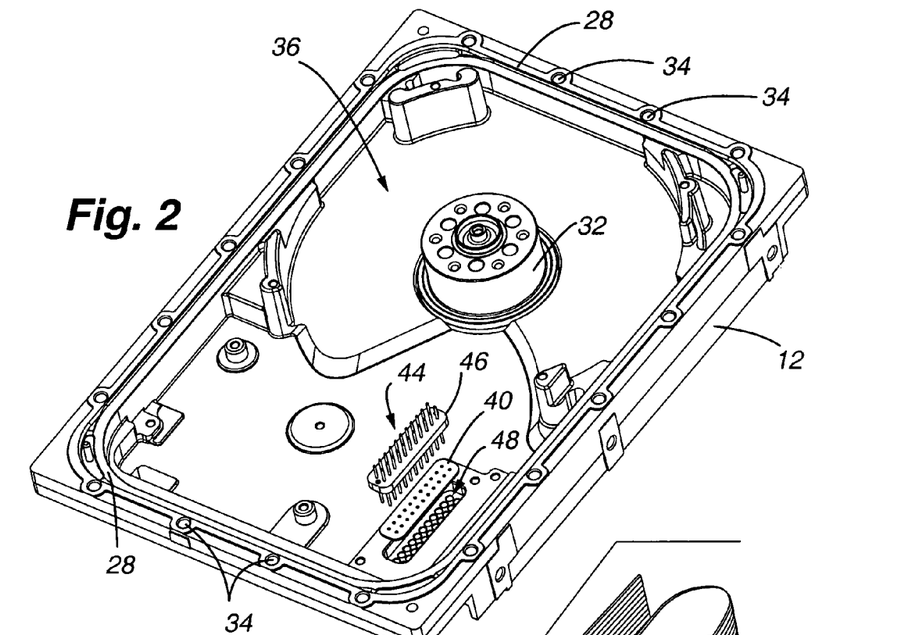
FIG. 2 is an exploded perspective view of a printed circuit board connector and seal and a hard disk drive base plate.
Figure 3:
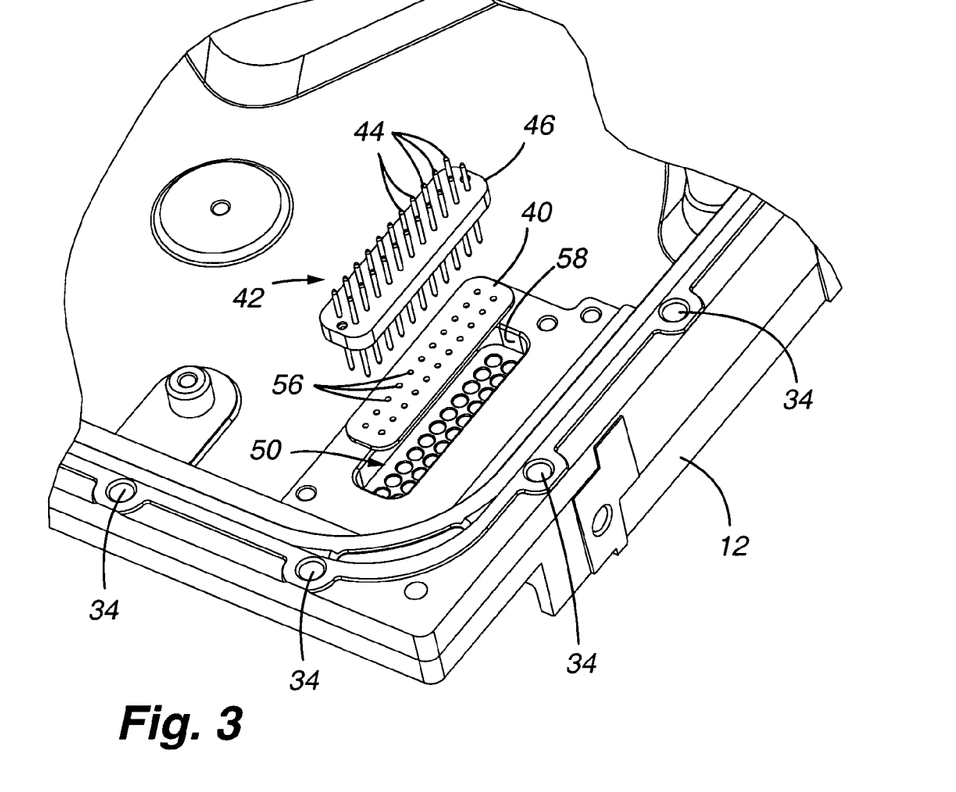
FIG. 3 is an enlarged exploded perspective view of the printed circuit board connector, seal and base plate of FIG. 2.
Figure 4:
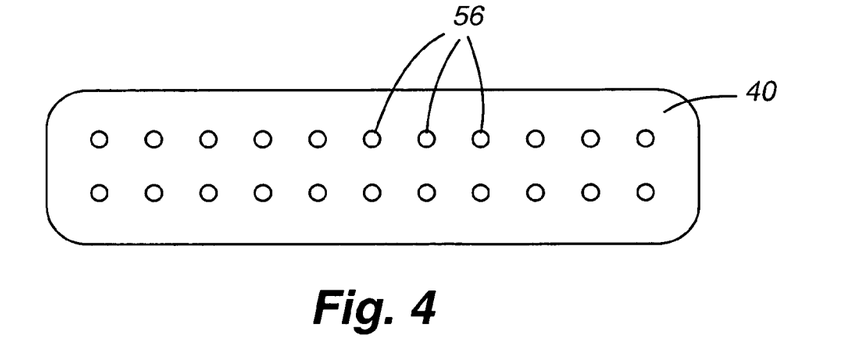
FIG. 4 is a top plan view of the seal illustrated in FIGS. 2 and 3.

Turning to FIGS. 2-4, a preformed epoxy insert or epoxy preform seal 40 is shown. Also shown is a 24-pin connector 42 comprising 24 individual pins 44. For purposes of manufacturability and assembly, the electrical connector pins 44 are affixed in a predetermined orientation in a plastic base. The pins electrically connect components mounted on a printed circuit board (not shown) secured to the underside or exterior of the base plate through the base plate to the flex circuit 20 within the inner chamber 36 of the disk drive housing. The base plate is provided with an opening or pass-through 48 for the multi-pin connector. In one embodiment, the pass-through comprises a recess or trough 50 formed on the inside surface of the base plate with an array of cylindrical openings 52 passing completely through the base plate. In the preferred embodiment, the number and size of the array of apertures 52 correspond to the number and orientation of pins 44 in the desired electrical connector. As shown more clearly in FIG. 5, the connector wiring harness and mounting bracket 22 engages the pins 44 at contact portion 54. The contact portion 54 creates a direct electrical connection between the individual pins 44 and the flex circuit 20. The mounting bracket is secured to the inside surface of the base plate by appropriate fasteners.

Figure 5:
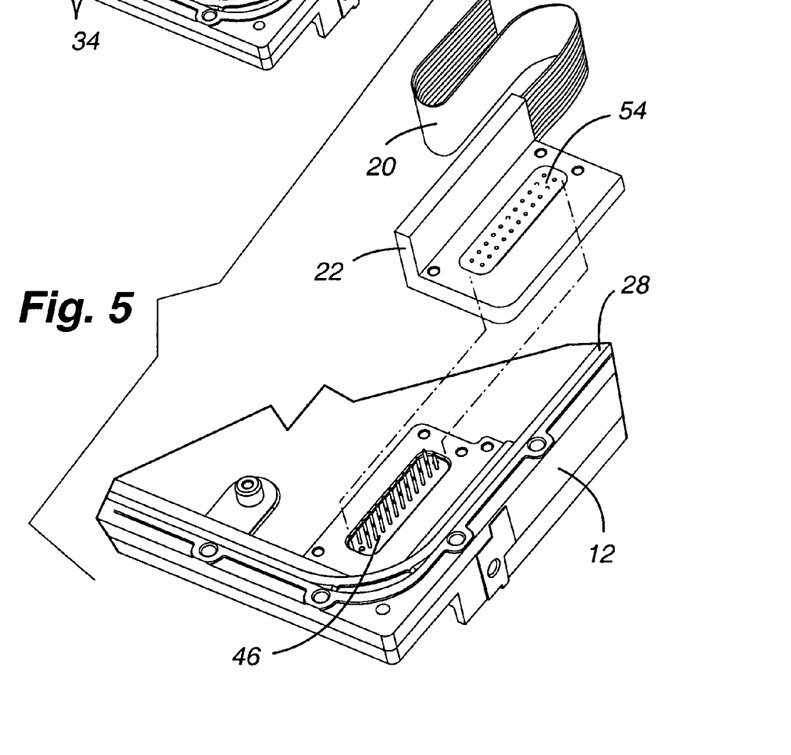
FIG. 5 is a partial exploded perspective view of a flex circuit, connector and base plate.

One embodiment of a preformed epoxy insert or seal 40 is shown in FIGS. 3, 4 and 5. The preform 40 is made from an epoxy and includes an array of apertures 56 which correspond to the configuration of pins 44 in the electrical pin connector 42. The configuration of the preform 40 may vary to accommodate most any configuration of pin connector 42, or any opening 52 in the base plate or cover of a disk drive. As those of skill in the art will appreciate upon review of this disclosure, the preform has substantial versatility to adapt to shapes and openings, and successfully seal those openings.

An example of an acceptable epoxy is LCA4 from Bacon Industries, which is mixed with catalyst BA5 and is limestone-filled. In one embodiment, LCA4 cures at room temperature within 24 to 48 hours. In this example, the epoxy preform may be created and stored at temperatures lower than room temperature to avoid curing and to facilitate handling and assembly. With LCA4 epoxy, the preforms are stored at −40° C. to avoid curing. Thus, the epoxy preform may be easily handled and positioned relative to the connector pins 44 and the pass-through 48 in the disk drive base plate. Within 24 to 48 hours of assembly, sitting in a room temperature environment, the epoxy will flow around the pins 44 and between the base 46, apertures 52 and cavity 50 to create a hermetic or substantially hermetic seal. Alternatively, the curing may be accelerated by elevating the temperature, for example, to 200° F. for two hours. Thus, following subassembly of the epoxy preform, electrical connector and base plate, the subassembly may be placed in storage at the appropriate curing temperature where over an appropriate period of time the epoxy flows to fill the voids and cures into a hard hermetic seal. Further assembly of components into the base plate may then proceed without risk of damaging the seal.

Filling the epoxy with limestone or other filler reduces the coefficient of thermal expansion (CTE) to match aluminum and also inhibits migration or diffusion of low density gas, such as helium. Glass and other fillers could be used as would be appreciated by those of skill in the art. Catalyst BA5 provides a good adhesion to pins that are gold-plated. Gold plating enhances conductivity of the pins. The epoxy and its constituent components should not be conductive, which could short the pin connectors.

Figure 6A:
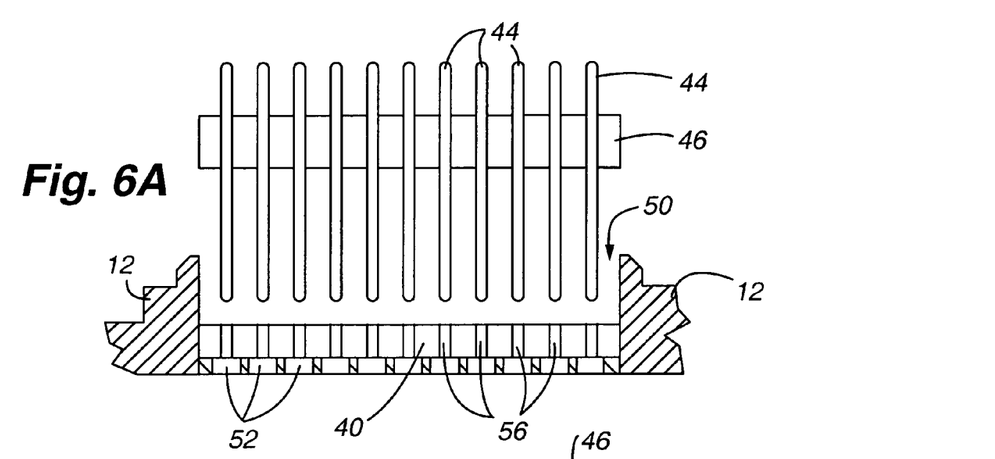
FIG. 6A is a cross-section view of a printed circuit board connector and seal prior to assembly.
Figure 6B:
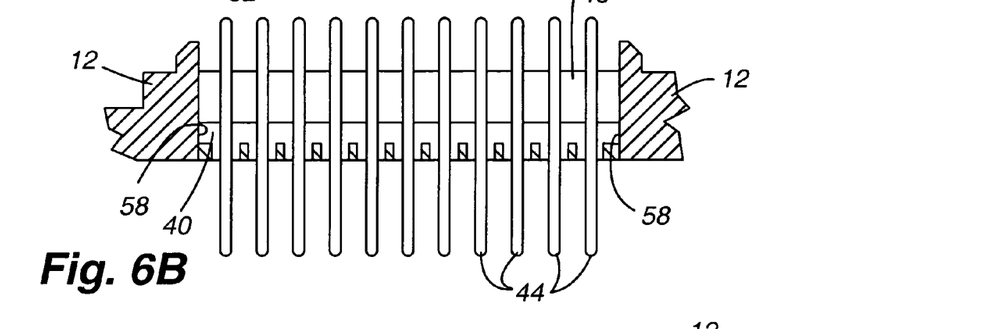
FIG. 6B is a cross-section view of the printed circuit board connector and seal of FIG. 6A following assembly and reformation of the seal.
Figure 6C:
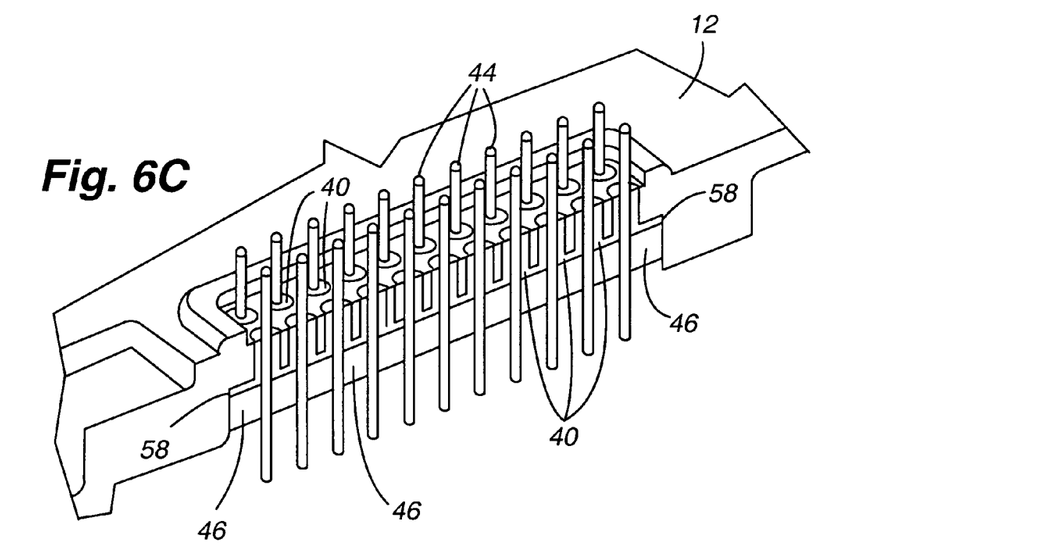
FIG. 6C is a partial cross-section perspective view of the embodiment of FIG. 6B, illustrated from the bottom of FIG. 6B.

FIGS. 6A-C generally illustrate the subassembly and curing process for the preferred embodiment. During assembly, the preform 40 is taken from storage, where it is maintained at a temperature below its curing temperature, and placed within the recess 50 of the base plate. As shown in FIG. 6A, the openings 56 in the preform are dimensioned to be of essentially the same cross-sectional shape as the pins 44. As illustrated, the openings 56 are smaller than the openings 52 in the base plate. The connector 42 is then forced through the preform until the base 46 abuts the preform and the pins 44 are fully extended through the openings 52 in the base plate. At this point, the epoxy has not softened and it does not adhere to the pins 44 as they are pressed through the openings 56. With reference to FIG. 6B, the temperature of the preform is then elevated, causing it to soften and flow into the openings 52 in the base plate and fully surround the electrical pins to create a substantially hermetic seal around each pin. As previously mentioned, this may be accomplished by subjecting the preform and base plate to an accelerated elevated temperature, such as in an oven with exposure to a heat lamp, or the preform may be made to soften and cure slowly at room temperature. Similarly, the epoxy adheres to the base 46 and to the side walls 58 of the cavity 50 to complete the seal. A cured seal is illustrated from the exterior side of the base plate in FIG. 6C. Unlike manual epoxy fill or machine epoxy fill, uniformity in application and a complete seal is achieved. In addition, waste is substantially reduced as is the need for maintenance of application equipment.

Epoxies can be generally described as having three stages: A, B and C. The A stage is when the epoxy is being formed, the B stage is prior to setting, and the C stage is after it is set. The present invention allows use of any epoxy that can be maintained and handled in its B stage, preferably at or about room temperature, and if its C stage curing temperature is around room temperature or higher. As previously mentioned, the preform 40 can be formed in any shape, in any volume, and is not limited to use in intricate situations such as around connector pins. The seals may be preformed in large sheets or individually as required for a particular application. Preforms may be cut from larger sheets of epoxy in its B stage. The preform may be made by molding the epoxy into a desired shape or by stamping out preforms in a B stage state, if the material is not too brittle. The preforms can be maintained or inventoried at a temperature below the curing temperature (C stage), which is preferably in a cool environment, such as in a refrigerator, cooler or freezer. Preforms as described herein may be assembled into disk drives using automated equipment to lower assembly line costs and reduce the need for manual labor or may be inserted manually. Such preforms will provide a constant or uniform fill and avoid clogged needles and variable or non-uniform flow as presently occurs with automated equipment. Waste is reduced by molding preforms with the precise volume of epoxy needed or by remelting and reusing excess epoxy if the preforms are cut from large sheets.

Other examples of where the preformed epoxy seal may be used to seal openings in a disk drive, including a low-density gas-filled disk drive, include between the spindle motor and base plate, between the spindle or actuator and cover plate and between the cover and base plate. Other locations will be apparent to those of skill in the art upon reading the foregoing and such applications are considered within the scope of the present invention.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
    positioning a single epoxy seal member adjacent a housing aperture extending through a housing member, the epoxy seal member having a first shape and a preformed pin aperture;
    placing an electrical connector onto the epoxy seal member so that an electrical pin extending from the electrical connector is inserted through the pin aperture in the epoxy seal member and into the housing aperture of the housing member; and
    curing the epoxy seal member so that the epoxy seal member changes to a second shape that continuously and respectively adheres to multiple electrical pins and the housing member to form a substantially hermetic seal of the housing aperture while permitting an electrical connection between components on opposite sides of said housing member.

2. The method of claim 1, wherein the curing step comprises directing heat from a heat source to the epoxy seal member.

3. The method of claim 2, wherein the directing step comprises directing said heat to the housing member for transference to the epoxy seal member.

4. The method of claim 1, wherein the epoxy is a thermosetting resin.

5. The method of claim 1, wherein the electrical connector comprises a plurality of spaced apart, adjacent electrical pins, and wherein the placing step comprises inserting each of said plurality of spaced apart, adjacent electrical pins through a corresponding pin aperture of the epoxy seal member and into the housing aperture.

6. The method of claim 1, wherein the positioning step takes place while the epoxy seal member is at a temperature significantly below an ambient room temperature, and wherein the curing step comprises maintaining the housing member, the electrical connector and the epoxy seal member in an environment at said ambient room temperature while allowing the epoxy seal member to gradually achieve said ambient room temperature.

7. The method of claim 6, further comprising curing the seal member for at least approximately 24 hours.

8. The method of claim 1, wherein the cured epoxy seal member forms a hermetic seal for the housing member to retain a pressurized atmosphere of low density gas.

9. The method of claim 8, wherein the low density gas is helium.

10. The method of claim 1, comprising maintaining the epoxy seal at a temperature below its curing temperature prior to positioning said epoxy seal over said openings.

11. The method of claim 1, further comprising limiting diffusion of a low-density gas across said seal member following curing to a rate less than $4.3E^{-8}$ cubic centimeters per second.

12. The method of claim 1, wherein the housing member forms a portion of a hermetically sealed housing for a data storage device, and wherein the electrical pin forms an electrical conduction path from an interior of the hermetically sealed housing to an externally mounted component.

13. The method of claim 1, wherein the epoxy seal member is characterized as a preformed epoxy insert with a plurality of said pin apertures, wherein the electrical connector comprises a corresponding plurality of said electrical pins rigidly coupled to a connector body, wherein the positioning step comprises disposing the preformed epoxy insert into contacting abutment with a sidewall of a recess of the housing aperture, and wherein the placing step comprises subsequently advancing the connector body toward the preformed epoxy to concurrently insert each of the plurality of said electrical pins through a corresponding one of the plurality of said pin apertures.

14. The method of claim 1, wherein the epoxy seal member has an overall thickness bounded by opposing first and second sides, and wherein the preformed pin aperture fully extends through said overall thickness from the first side to the second side prior to contact between the epoxy seal member and the electrical pin.

15. A method comprising:
    positioning a single piece epoxy seal member adjacent and exterior to a housing aperture extending through a housing member, the epoxy seal member having a first shape that spans a housing cavity and a plurality of spaced apart pre-formed pin apertures that extend through the epoxy seal member;
    placing an electrical connector having a plurality of electrical pins and an insulating base into abutting relation with the epoxy seal member in the housing cavity so that each electrical pin extending from the electrical connector is inserted through a corresponding pin aperture in the epoxy seal member; and curing the epoxy seal member so that the epoxy seal member continuously adheres to multiple electrical pins to seal the housing aperture.

16. The method of claim 15, wherein the epoxy seal member changes shape during the curing step.

17. The method of claim 15, wherein the epoxy seal member undergoes an increase in temperature during the curing step.

18. The method of claim 15, wherein the epoxy seal member has an overall thickness bounded by opposing first and second sides, and wherein the preformed pin apertures each fully extend through said overall thickness from the first side to the second side prior to contact between the epoxy seal member and the respective electrical pins.

* * * * *